(12) United States Patent
Qiu

(10) Patent No.: US 8,271,529 B2
(45) Date of Patent: Sep. 18, 2012

(54) LOCATION-BASED AND TIME CONTROL-BASED INTERACTIVE INFORMATION GROUP AND DISTRIBUTION PLATFORM

(76) Inventor: Yuheng Qiu, Milpitas, CA (US)

( * ) Notice: Subject to any disclaimer, the term of this patent is extended or adjusted under 35 U.S.C. 154(b) by 183 days.

(21) Appl. No.: 12/852,583

(22) Filed: Aug. 9, 2010

(65) Prior Publication Data

US 2011/0035384 A1 Feb. 10, 2011

Related U.S. Application Data

(60) Provisional application No. 61/232,674, filed on Aug. 10, 2009.

(51) Int. Cl.
*G06F 17/30* (2006.01)
(52) U.S. Cl. ......... 707/784; 707/601; 707/609; 707/804
(58) Field of Classification Search ................. 707/601, 707/609, 784, 804
See application file for complete search history.

(56) References Cited

U.S. PATENT DOCUMENTS

| | | | | |
|---|---|---|---|---|
| 6,263,434 B1 * | 7/2001 | Hanna et al. | ................... | 713/156 |
| 7,305,702 B2 * | 12/2007 | Bell et al. | ........................... | 726/5 |
| 7,487,170 B2 * | 2/2009 | Stevens | ................................ | 1/1 |

* cited by examiner

*Primary Examiner* — Etienne Leroux
*Assistant Examiner* — Bruce Witzenburg

(57) ABSTRACT

An information group is disclosed for enabling user to retrieve and modify information and interact with other user. An information group is defined by three attributes as location, time span and topic. User has to meet requirement on an information group's location and time span attributes in order to interact with information stored inside information group and communicate with other users inside the same information group. Information group dynamically adjusts its location and life span attributes based on its interaction with user. When multiple information groups are available to a user, they are ranked based on their location attribute and user information and presented to user in the ranked order. Several applications enabled by our invention are disclosed, including but not limited to transportation sharing, connecting users that share a common interests, event signing up, or service or product promotion.

44 Claims, 7 Drawing Sheets

| Attribute section | Topic attribute: | Title: Who want to share Taxi with me?<br>Number of hierarchical levels: 3<br>• Hierarchical level 1 subtopic: Travel or related<br>• Hierarchical level 2 subtopic: Resource Sharing<br>• Hierarchical level 3 subtopic: Taxi<br>Tags/Keywords:<br>    Taxi, Sharing, Carpool |
|---|---|---|
| | Location attribute: | Number of regions: 1<br>Region 1 Central Point: 1 Market Street, San Francisco, CA, 94105<br>Region 1 radius: 500 feet |
| | Life span attribute: | Starting time point: Pacific time (GMT -08:00) 4:30PM, April 25, 2009<br>Ending time point: Pacific time (GMT -08:00) 8:30PM, April 25, 2009 |
| Information content section | Various kinds of specific information content section, will be illustrated in fig. 4A, fig. 4B and fig. 4C. | |

| | | |
|---|---|---|
| Attribute section | Topic attribute: | Title: Who want to share Taxi with me?<br>Number of hierarchical levels: 3<br>• Hierarchical level 1 subtopic: Travel or related<br>• Hierarchical level 2 subtopic: Resource Sharing<br>• Hierarchical level 3 subtopic: Taxi<br>Tags/Keywords:<br>        Taxi, Sharing, Carpool |
| | Location attribute: | Number of regions: 1<br>Region 1 Central Point: 1 Market Street, San Francisco, CA, 94105<br>Region 1 radius: 500 feet |
| | Life span attribute: | Starting time point: Pacific time (GMT -08:00) 4:30PM, April 25, 2009<br>Ending time point: Pacific time (GMT -08:00) 8:30PM, April 25, 2009 |
| Information content section | Various kinds of specific information content section, will be illustrated in fig. 4A, fig. 4B and fig. 4C. | |

Fig. 2

| Current Time: 12:30PM (Pacific Time, GMT -08:00), April 25, 2009 | | | | | |
|---|---|---|---|---|---|
| Ranking | User ID/ Information | User login time | Call User | Send Instant Message | Send SMS to user |
| 1 | John Doe | 12:05PM, 04/25/09 | Click here to call | Click to IM | click here to SMS |
| 2 | Mike | 12:07PM, 04/25/09 | Click here to call | Click to IM | Click here to SMS |
| 3 | Jon | 12:15PM, 04/25/09 | Click here to call | Click to IM | Click here to SMS |

| Current Time: 12:40PM (Pacific Time, GMT -08:00), April 25, 2009 | | | | | |
|---|---|---|---|---|---|
| Ranking | User ID/ Information | User login time | Call User | Send Instant Message | Send SMS to user |
| 1 | Mike | 12:07PM, 04/25/09 | Click here to call | Click to IM | Click here to SMS |
| 2 | John | 12:15PM, 04/25/09 | Click here to call | Click to IM | Click here to SMS |
| 3 | Tom | 12:33PM, 04/25/09 | Click here to call | Click to IM | Click here to SMS |

Fig. 4A

Wiki page information content section:

| Image section of the wiki page | Text section of the wiki page | Video section of the wiki page | Audio section of the wiki page | Click here to modify wiki page |
|---|---|---|---|---|

User information section:

| John Doe | Click to Call | IM user | Send SMS |
|---|---|---|---|
| Mike | Click to Call | IM user | Send SMS |
| Jon | Click to Call | IM user | Send SMS |

Fig. 4B

| Information post Creator | Call Creator | IM Creator | Send Creator SMS | Information Post Content | Modify information post |
|---|---|---|---|---|---|
| John Doe | Click Here | Click Here | Click Here | Hello, my friend | Click Here |
| Mike | Click Here | Click Here | Click Here | Call me if you want to meet | Click Here |
| Jon | Click Here | Click Here | Click Here | Who can change for a dollar | Click Here |
| Click here to create your own information post | | | | | |

Fig. 4C

LOCATION-BASED AND TIME CONTROL-BASED INTERACTIVE INFORMATION GROUP AND DISTRIBUTION PLATFORM

TECHNICAL FIELD

The following disclosure relates generally to social networking and, more particularly, to an information group that allows users to receive, modify, and create information content.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DESCRIPTION OF PRIOR ARTS

A key concept discussed in this patent is leveraging location information to facilitate various inter-person communications that is otherwise not possible, and dynamically evolving the way how such inter-person communication should be facilitated based on the pattern of inter-person communication.

There are some prior arts using location information through information sharing and communication process. For example, Merheb, Patrick filed a patent on Jul. 29, 2003 (application Ser. No. 10/628,410. Publication number: US 2004/0023670) for a method of providing location information from a mobile device to a group of mobile devices using an instant messaging protocol. Libov Jonathan and Pratt Fred filed a patent on Aug. 8, 2006 (application Ser. No. 11/500,826. Publication number: US 2007/0037574 A1) for a method to facilitate communication between users in a localized community. This method provides a scheme to select a network location. The selection registers the user in the network location. Users registered in a same network location are aware the presence of each other, thus allowing the registered user to select other registered users; and notifying the selecting registered user if the selection is mutual. Sudit Isaias et al. filed a patent on Sep. 8, 2006 (application Ser. No. 11/517,846. Publication number: US 2007/0060171 A1) for a system architecture for developing location-based applications comprising a mobile device. This architecture targets for systems that include the following components: location information provider, application provider, application server, and application itself. The proposed portal stores location-based application functionality to be used by such systems. Davis Darren R. et al. on Jun. 29, 2006 (application Ser. No. 11/477,962. Publication number: US 2008/0004888 A 1) disclosed a system to use location information in e-commerce. In this system, a retail location proximate the location of a user is first identified. Based on the identified retail location, a wireless communication session between the user's mobile communication device and a wireless network node is established, through which, the consumer to receive information regarding a commodity that is available for transfer on behalf of the merchant entity; and an exchange of consideration between the consumer and the merchant entity is also enabled.

Besides the proposals, with the increasing popularity of location-capable mobile devices like iPhone and Android phones, location based systems have drawn great attention and momentum. Google Latitude (http://www.google.com/latitude), Facebook (http://www.facebook.com/), and Loopt (http://www.loopt.com) integrate location information into friend-based social networks, enabling friends to discover each other's location. FourSquare (http://www.foursquare.com) and Gowalla (http://www.gowalla.com) let users to check in to places, where popular places include shops, restaurants, parks, etc. Yelp (http://www.yelp.com) lists commercial entities proximate to a user's current location, and also allows users to leave opinions for these entities. Blockchalk (http://www.blockchalk.com) lets users use mobile phones to leave messages in your neighborhood and see what your neighbors are saying. This helps people communicate with each other on topics related with their location.

While the above prior arts all utilize location information in their offerings, they all passively collect and communicate location information without evolving the location information or attribute within the system. In our disclosed invention, the information group will evolve and dynamically change its location and other attributes based on its user activity patterns. The evolving nature of information group in our invention makes it possible to closely adapt the changing user behavior, and correct any initial mistake when an information group was first established.

SUMMARY OF THE INVENTION

The present invention provides a method, apparatus, computer program, and system, which offer social service through an information group. The information group is uniquely identified by three attributes as topic, location and life span. A user who meets an information group's requirements on location and life span attributes is allowed to receive, modify and create information content stored in the information group, and communicates with other users who also satisfy the same requirements imposed by the same information group.

The method, apparatus, computer program and system that allows an information group to adjust the values of its location and life span attributes. In particular, the invented system and method utilize specific measurements about user activities inside an information group to adjust the location and life span attribute of that information group.

The method, apparatus, computer program and system that enables a user to create an information group, with or without the reference of other existing information groups.

The method, apparatus, computer program and system that ranks multiple information groups based on the information regarding user position, individual information group's location attribute, and patterns and statistics of user activities related to individual information group. Multiple information groups concerning specific location and time period are displayed to user in an order determined from the ranking process.

The method, apparatus, computer program and system that hosts single or multiple information groups.

BRIEF DESCRIPTION OF THE DRAWINGS

FIG. 2 is an example information group, under an embodiment.

FIG. 4A is an example of an "information content" section of an information group, under an embodiment.

FIG. 4B is another example of an "information content" section of an information group, under an embodiment.

FIG. 4C is yet another example of an "information content" section of an information group, under an embodiment.

DETAILED DESCRIPTION

Figure 1:
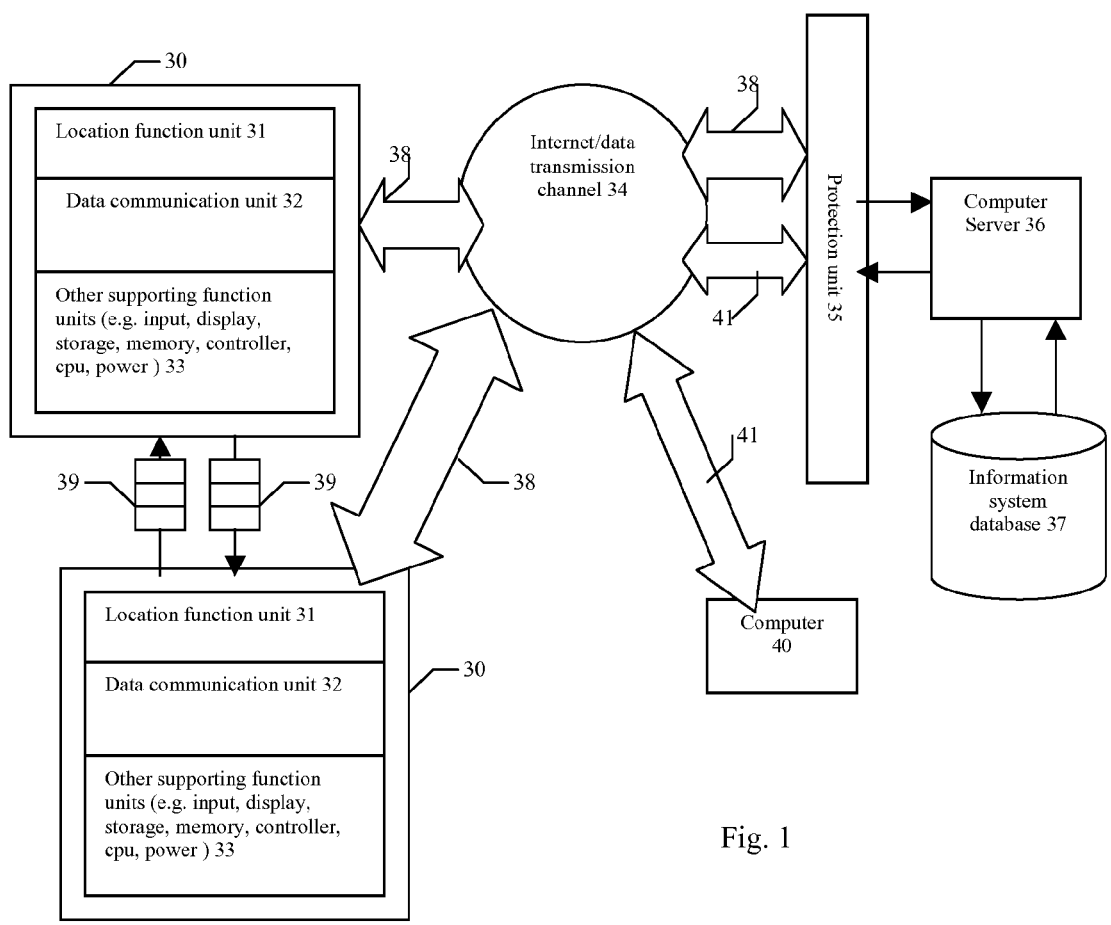
FIG. 1 is a block diagram of a communication system having the information group(s) hosted on an information distribution platform, under an embodiment.

Embodiments described below include a method comprising generating an information group including an attribute section and an information content section. The attribute section comprises a plurality of attributes, and the information content section comprises content generated by a plurality of users. The method comprises controlling electronic access by the plurality of users to the information group based on a correspondence between information of a user and the plurality of attributes. The method comprises allowing the user granted electronic access to the information group to at least one of generate, receive, and modify the information group via a remote client device of the user.

Embodiments described below include a communication system comprising a distribution platform coupled to a network. The distribution platform communicates via the network with remote client devices of a plurality of users. The system comprises a plurality of information groups hosted on the distribution platform. Each information group comprises an attribute section and an information content section. The attribute section comprises a plurality of attributes. The information content section comprises content generated by the plurality of users. The distribution platform controls access by a user to each information group based on a correspondence between information of the user and the plurality of attributes. The user granted access to an information group at least one of generates, receives, and modifies the information group via a remote client device of the user.

Systems and methods are described below including an information group that allows users to receive, modify, and create information content. An information group, however, is only active within a specific time period, and only interacts with users that are geographically located within certain proximity to certain specific location. In particular, an information group is uniquely identified by a number of attributes. In an embodiment, the information group comprises three attributes, and the attributes include topic, location and life span, but the embodiment is not so limited. The information group enables users to receive, modify and create information content stored in the group, and also to communicate with other users within the same group, but only within the time period specified by the information group's life span attribute, and only for the user who is geographically located in the region(s) specified by the information group's location attribute.

The information groups of an embodiment are hosted on a distribution platform. The distribution platform hosts one or multiple information group(s). The systems and methods of an embodiment allow one or more users to access, generate, and/or modify information groups. Embodiments also adjust or modify the location and life span attributes of an information group. In particular, the systems and methods use specific information or measurements of user activities to adjust the location and life span attributes of the information group.

The systems and methods of an embodiment rank multiple information groups. Data of an information group's location attribute and user position, along with patterns and statistics of user activities related to the information group, are used to rank individual information groups. Multiple information groups relating to specific locations and time periods are displayed to users in an order corresponding to the rank.

The information group of an embodiment provides a location-based and time-based, interactive, two-way information flow that provides users the ability to not only receive, but also modify and/or create information content concerning specific topics, locations and time periods. In this manner, the information group provides information to other users that includes the thoughts or comments of previous users on information like specific topics, locations and time periods. The different information groups are ranked according to information of specific locations and time periods, such that a user is presented the most meaningful and significant information concerning a specific location at a particular time period.

In the following description, numerous specific details are introduced to provide a thorough understanding of, and enabling description for, embodiments. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of a communication system having the information group(s) hosted on a distribution platform, under an embodiment. The distribution platform, also referred to herein as the information group distribution platform (IGDP) comprises numerous IGDP components, including a computer server 36 coupled to a database 37. The server 36 is coupled to a communication network 34 via a protection component 35. Remote devices including client device(s) 30 and other processor-based devices 40 interact with the information distribution platform via the communication network 34.

The information 38 communicated between device 30 and backend server 36 is transmitted via Internet or any other form of data transmitting channel 34, and there is a protection unit 35 (e.g., a firewall) in front of the server 36. The server 36 communicates with a database 37 that stores the information about each specific information group (e.g. attributes, snippet, and information content), as well as user information (e.g. user id, contact information, etc) and other relevant information.

The IGDP components described herein can be components of a single system, multiple systems, and/or geographically separate systems. The IGDP components can also be subcomponents or subsystems of a single system, multiple systems, and/or geographically separate systems. The IGDP components can be coupled to one or more other components (not shown) of a host system or a system coupled to the host system.

The IGDP components can be located together or in separate locations. Communication paths (e.g., network 34) couple the IGDP components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

The IGDP of an embodiment includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the IGDP, and/or provided by some combination of algorithms. The IGDP methods described herein can be implemented in one or more of software algorithm(s), programs, firmware, hardware, components, circuitry, in any combination.

FIG. 2 is an example information group, under an embodiment. The information group accommodates user's needs to consume, create, publish and exchange information. A distribution platform hosts one or more information groups, as described below. The format of the information group includes examples such as, but not limited to, online discussion, trading, shopping, advertising, auction forum, user community or bulletin board and the like. Each information group restricts access to users who are geographically located within a pre-specified proximity to a specific location or locations and within certain specific time period specified in the information group to which the user is attempting access. Once a user logs into a specific information group, he/she can receive, modify and create information content stored in the group. Multiple users who are logged in to the same information group during the same time period can communicate, or share information/resource/service/goods with each other as long as they remain logged in to the same information group. Users can also generate or create individual information groups based on their needs.

The information group of an embodiment comprises two sections, including an attribute section and information content section. Each information group is uniquely identified by some number (e.g., three) of different attributes in the attribute section. In an embodiment, the attributes of the attribute section include, but are not limited to, Topic, Location and Life span. Different information groups can have at least one different attribute.

Topic is an attribute that determines what specific type of information or service or resource or goods are discussed, addressed, displayed, exchanged or traded in the particular information group. It can be expressed in terms of a summary, a hierarchical structure of topics, and/or as a set of keywords or tags, or any arbitrary combination of them. An example topic (FIG. 2) includes a combination of summary, three-level sub-topics hierarchical structure and two tags. The summary of the topic is about "Who want to share Taxi with me". For sub-topic hierarchical structure, the first level is about "Travel", the second level is about "Resource sharing" inside "travel", and the third level is about "Taxi" inside "Resource sharing" of "Travel". The topic also includes tags or keywords (e.g., "taxi" "sharing" and "carpool").

The Location attribute of the information group is defined to include at least one geographical region that is further defined as a geographical center and an area surrounding it with certain proximity. The example topic (FIG. 2) specifies one geographical region in its location attribute, but is not so limited. The geographical center is defined either as the address of "1 Market Street, San Francisco, Calif., 94105", or the corresponding latitude and longitude pair of "37.793819/–122.395089", and the surrounding area is defined as a circle with a radius of 500 feet. For each particular region of an information group, both the geographical central point and its surrounding area can change during its life span. Such changes are triggered by certain patterns or statistics of user activities, which also determines how it changes.

The Life span attribute of the information group is defined to include a duration or period of time between a starting time point and an ending time point. The time could be the local time corresponds to the region(s) specified in the location attribute of that information group, or in universal time. The information group of the example topic specifies the starting time point as "Pacific Time 4:30 PM, Apr. 25, 2009", and the ending time point as "Pacific Time 8:30 PM, Apr. 25, 2009." A particular information group may not permit a user to login, receive, modify and/or create information content before its starting time point, and may force users to log off or constrain user activities when the time pass the ending time point of the information group. An information group is considered to be "live" if the current time instance is within its life span. Like the location attribute, the life span attribute of an information group could also change based on observed patterns or statistics of its user activities.

In addition to topic, location and life span attributes, each information group also has an "information content" section. This "information content" section includes the information that users can access or modify after logging in. The "information content" section is described in detail below.

Figure 3:
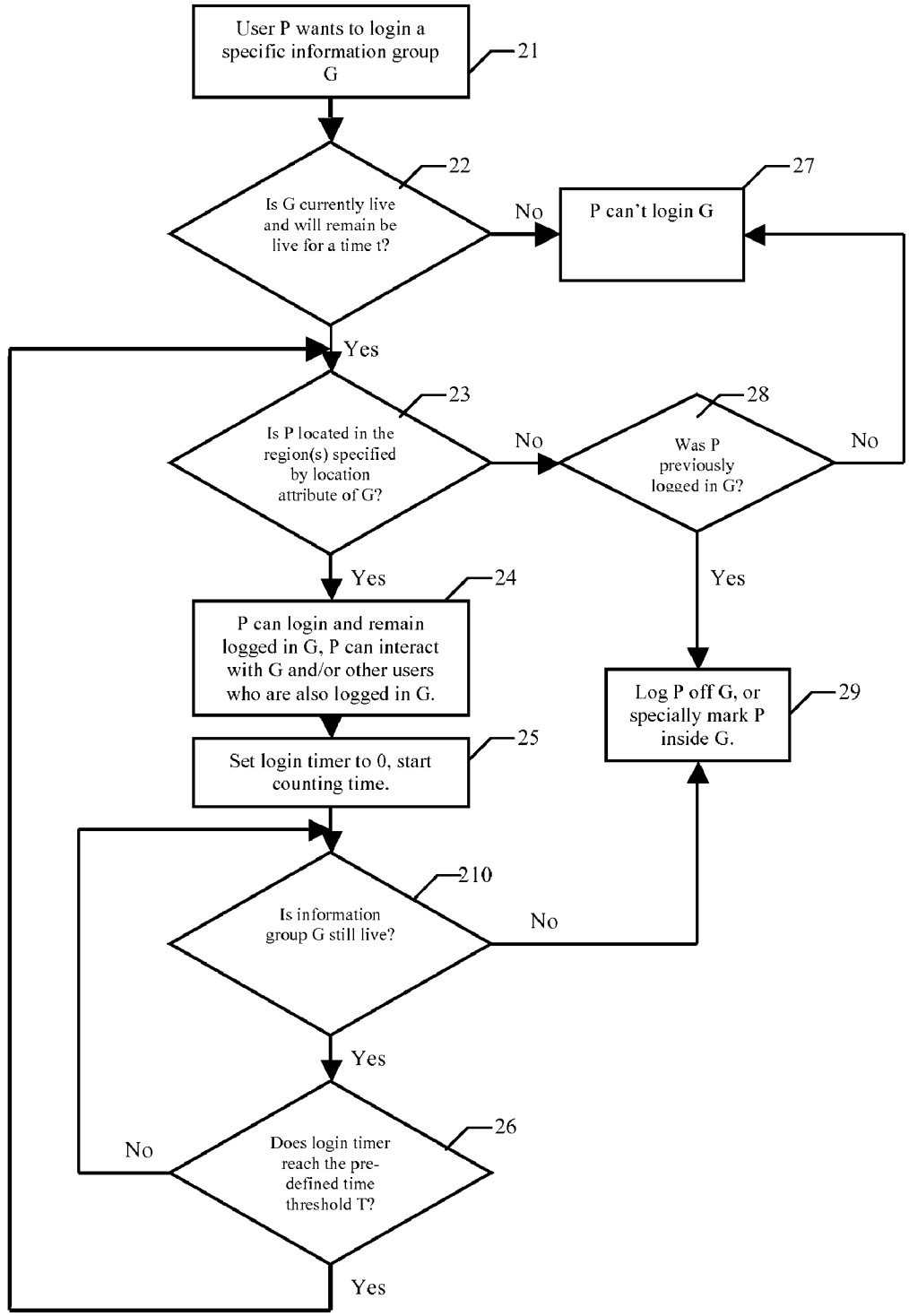
FIG. 3 is a flow diagram for proving user location to an information group in order to login, access, modify or create information in the information group, under an embodiment.

FIG. 3 is a flow diagram for proving user location to an information group in order to login, access, modify or create information in the information group, under an embodiment. In order for a user P to login and have successful interaction with an information group G at a particular time instance 21, where interaction includes logging in, accessing, modifying or creating information inside the "information content" section of the group, and/or communicating with other users in the same group, the following requirements should to be met: the information group G is live and will remain live for a pre-determined time period at the time of the interaction, which is shown in 22; the user is located in a geographical region specified by the location attribute of the information group G as 23. A user can login and start interacting with an information group once the above two requirements are satisfied, as in 24. Meanwhile, however, the user also has to periodically prove his/her location to the information group G during a predetermined period, or each time when the distance between an old and a new location exceeds a certain threshold, in order to remain logged in so as to continue interacting with the information group.

In an embodiment, a predefined login timer is started when a user P passes the location and life span requirement, as in 25, and when the timer expires at time instance T as in 26, the user has to re-prove his/her location to the information group to remain logged in the information group, after which the timer is restarted, and the same procedure is repeated. In another embodiment, a pre-determined location change threshold is notified to the device that user uses to login and access information group, when user first logs in an information group, his/her location will be marked as "old location", and whenever the distance between this "old location" and the current location of the user or user device is beyond this distance threshold, user has to re-prove his/her location to the information group to remain logged in the information group, after which the current location of user or user device will be labeled as "old location", and the same procedure is repeated. The process of re-proving a user's location to the information group can either be performed automatically without user attention, or the user can be notified via message before the process is executed. When a user of a live information group moves to an area outside of the regions specified by the location attribute, he/she will either be forced to log off or be specially marked inside that information group as 29, and he/she will lose at least partial ability to perform those interactions defined in this paragraph with that information group G. Of course, user P could voluntarily logoff information group G at any time instance. Also, when the time passes the ending time point and information group G is no longer live, as in 210, user P would either be forced to logoff, or be specially marked inside the information group G.

For example, if a user wants to login to an information group G at local time 12:05 PM, stay logged in G for 15 minutes so he/she can access or modify information of G, or communicate with other users that are also logged in G in that 15-minute time period, he/she has to prove that he/she is located in at least one of the geographical regions specified by G location attribute from 12:05 PM until 12:20 PM. If he successfully logged into G at 12:05 PM, but moved outside of the regions specified by the G location attribute at 12:15 PM where he/she can no longer prove the location requirement, he/she will either be forced to log off or be specially marked at 12:15 PM. The consequence of being forced to log off or specially marked will make him/her unable to continue interacting with G. Of course, if that user moves back to the regions specified by G's location attribute at 12:25 PM, and G is live and will remain live for a certain time period at 12:25 PM, he/she can re-login G and re-interact with G again.

To prove location to the information group, a device 30 of the user tracks user's location in addition to access information content from the information group and/or communicate with other users that are in the same information group. An example of device 30 is a cell phone with both location (e.g. Global Position System) and web browsing functionality, such as iPhone made by Apple, Inc. or Blackberry device made by Research in Motion. Device 30 comprises many components, including a location information or data component 31 that provides location information, and a data communication component 32 that supports the data communication functions. There are other functional units 33 that provide other functionalities in order for user to login, to interact with the information group and/or interact with other users in the same information group. Unit 33 includes, but not limited to, user input, display, storage, power, control logic, computation and the like.

In addition to communicating with server 36, user device 30 can also communicate with other user devices 30. The communication between multiple user devices 30 of an embodiment is enabled using the IGDP as a communication relay (information distribution platform receives information from one user device 30 and passes the received information to another user device 30, for example in the format of instant messaging). Additionally, the communication between multiple user devices 30 of an embodiment can be direct 39 between the user devices, in any format that is supported by the user device 30. Some specific ways of direct communication between user devices include, but are not limit to, phone calls and short messaging service (SMS) messages. While actual information content is transmitted directly from the source user device to the target user device, the source user device uses the information group, which is hosted on the IGDP, to provide the target user device's identity in order to establish the communication. When communicating with other users, user has the ability to control whether and how much their privacy information is disclosed.

In addition to providing hardware support for a user to login, interact with information groups and communicate with other users through an information group, user device 30 and IGDP also enable users to create new information groups.

Once a user has successfully logged into an information group, he/she can access information in the "information content" section. Not only can a user receive information, he/she can also modify existing information or add new information or content to the information content section of an information group. In addition, he/she can communicate with other users who are also logged into the same information group. Because of this two-way information flow nature, the information and content of an information group at particular time instance may be affected by the activities of those users who have previously logged in. In other words, the information groups have "memory" about their past user activities, and those memories can affect the information or content perceived by the user who subsequently accesses the information group.

An example follows including two scenarios, scenario 1 and scenario 2. In each scenario, there is an identical information group G that becomes live at 12:00 PM, and user B logs into information group G at 12:10 PM. In scenario 1, user A logs into information group G at 12:02 PM, and user C also logs into information group G at 12:07 PM. In scenario 2, there are no other user logins before user B. Because of the two-way interactive nature of the information group, user A and C in scenario 1 may change the information or content of information group G, so the information or content that user B receives when he/she logs into information group G at 12:10 PM could be different in scenario 1 and 2. Of course, the specific types of information to be presented in the information content section and the specific way of user interacting with information content section varies from one information group to the other.

Examples of the information content section of different information groups are described below, but the embodiments herein are not limited to these examples. FIG. 4A is an example of an "information content" section of an information group, under an embodiment. FIG. 4B is another example of an "information content" section of an information group, under an embodiment. FIG. 4C is yet another example of an "information content" section of an information group, under an embodiment. The following examples are merely exemplifications of the principal of having various forms of user readable and/or writable information content section within an information group.

With reference to the information group of FIG. 4A, at each time instance, active users who are currently logged in are ranked based their login time. The ranking results are displayed to all the active users in the information group, and each user can contact any other user listed in the ranking list by phone call, instant message (IM) or Short Message Service (SMS) message. The ranking may change from time to time, either by a system administrator who manually moves user out of the ranking list, or updated automatically by the system, for example, removing users who are no longer logged in and adding new users who just logged in. In this example, users are ranked in the order of "John Doe", "Mike" and "Jon" at pacific time 12:30 PM, Apr. 25, 2009. Ten minutes later, "John Doe" is out of the list, while a new user "Tom" has been added to the list".

With reference to the information group of FIG. 4B, instead of a ranked list of all users, the information content section of this information group contains a wiki page that all logged in users can view and modify. The wiki page contains sub-sections of video, text, image and audio content, and a modification button. In addition to the wiki page, the information content section also includes a user information section, which lists all the users who are currently logged in the information group, and ways to communicate with them.

With reference to the information group of FIG. 4C, the information content section of an information group includes an information board where a logged in user can create individual information and post the information on the board. The individual information posted on the board is readable and/or writable to other users in the same information group. Users can find information about the post or about the post creator (e.g., his/her email address). Users can either modify individual information post (if allowed by the information post creator), or create new information post.

As illustrated in FIGS. 4A, 4B, and 4C, in addition to accessing, modifying or creating information content information groups offer user the ability of communicating with other users who are either currently logged in, or used to log in the same information group. The specific method of user communication includes, but is not limit to, telephone calls, instant messages (IM), and short message service (SMS) messages, and proprietary mechanisms provided by the information group. The communication between users could either be conducted in an anonymous fashion, or with some type of identifier (e.g., login name or real name), all depends on user's preference.

Figure 5:
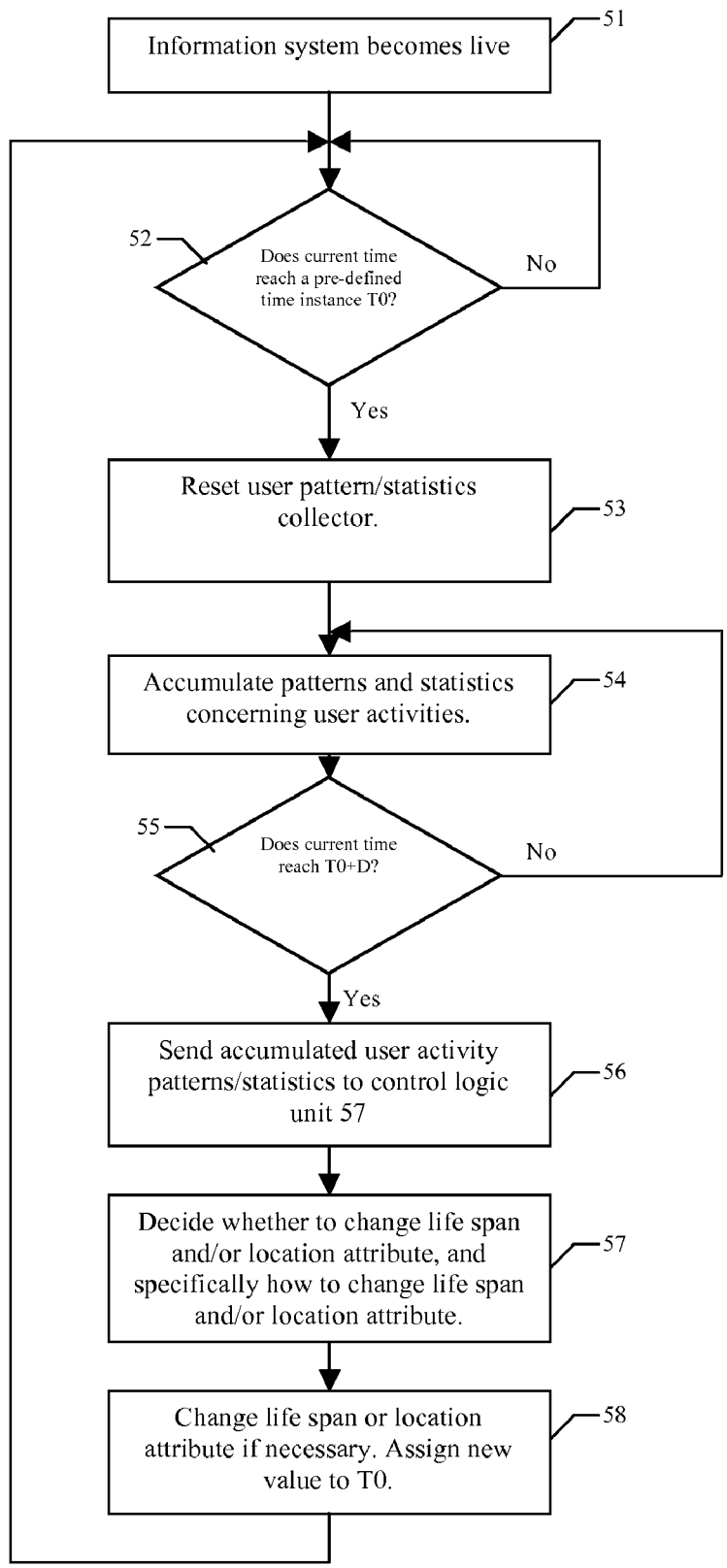
FIG. 5 is a flow diagram for changing life span and location attributes of an information group based on associated user activities, under an embodiment.

FIG. 5 is a flow diagram for changing life span and location attributes of an information group based on associated user activities, under an embodiment. Both the life span and location attribute of an information group can change according to past user activities. In particular, for each information group, there is a user activity collector that records all the desired user activities during a period of time. At a pre-defined time instance T0, information group will reset user activity collector and start to collect user activities patterns or statistics 52, 53, 54. Once the time instance reaches T0+D 55 information group will send the accumulated user activity statistics 56 to a control logic unit 57. Control logic unit 57 makes the following decisions: whether to change life span or location attribute; if change is necessary, what is the new value of life span and/or location attribute. Unit 58 executes the control logic unit 57 decisions, i.e., changes the life span and/or location attributes, and assigns a new value to the pre-defined time instance T0, so that information group could change the attributes again in future.

The life span attribute of an information group can either be reduced or expanded, based on user activity patterns and statistics. Reducing life span means moving the ending time point toward the starting time point, and expanding life span means moving the ending time point away from the starting time point. User activity patterns and statistics include those patterns and statistics concerning "user activities inside an information group", and those patterns and statistics concerning "user activities applied to an information group". Those patterns and statistics concerning "user activities inside an information group" are defined as measure of activities of users who are either logging or have already logged in a particular information group. Those measure of activities include, but are not limit to, patterns and statistics regarding user logins, duration of user stay in the information group, user receives, modifies, creates information stored in the information content section of an information group, user leaves feedback regarding the information content section of an information group, user communicates with other users through an information group.

An example of patterns and statistics concerning users' activities inside an information group is the count of user logins inside the time period from T0 to T0+D. The control logic 57 compares user login count against one pre-determined threshold to determine whether and how to reduce the life span of an information group. The control logic 57 compares user login count against another pre-determined threshold to determine whether and how to expand the life span of the information group.

Those "user activities applied to an information group" are defined as user activities that either reference to or generate impact to an information group, regardless whether or not the users who perform those activities are logged in that particular information group. Those patterns and statistics concerning user activities applied to an information group include, but are not limited to, patterns and statistics regarding users using the attribute of that information group to create another information group, patterns and statistics concerning users to create a new information group with same or similar attribute values to the existing information group, patterns and statistics concerning users to search for particular information group using specific value of topic summary, topic tag or keyword, and/or sub-topic hierarchical tree. Of course, the examples described herein are merely exemplifications of the principal of changing the life span attribute based on the patterns and statistics of user activities. An information group could either remain live for a time period that is much longer than its original life span, or expire after a time period that is shorter than its original life span, depending on its user activity patterns and statistics.

The location attribute of an information group can also be changed based on the patterns or statistics of past user activities. For each geographical region of the location attribute, both its center and surrounding area could change. The set of patterns or statistics of past user activities that affect the location attribute of an information group are the same as, but not limited to, the set of patterns or statistics of past user activities that affect the life span attribute of an information group, though the control logic unit 57 used for location attribute adjustment can be different from the control logic unit 57 used to adjust the life span attribute. In an example, if the surrounding area of one particular information group is defined as a circle centered on the center with certain radius, one way to adjust the surrounding area is to increase or decrease the radius based on the number and/or locations of the users who logged in the corresponding information group. Specifically, if the number of user logins exceeds a pre-specified threshold in the time period from T0 to T0+D, the radius of the surrounding area circle increases by a pre-defined percentage. If the number of user logins is less than a pre-specified threshold in the T0 to T0+D time period, the radius of the surrounding area circle decreases by another pre-defined percentage. Again, examples in this paragraph are merely exemplifications of the principal of changing location attribute based on the patterns or statistics of user activities.

Figure 6:
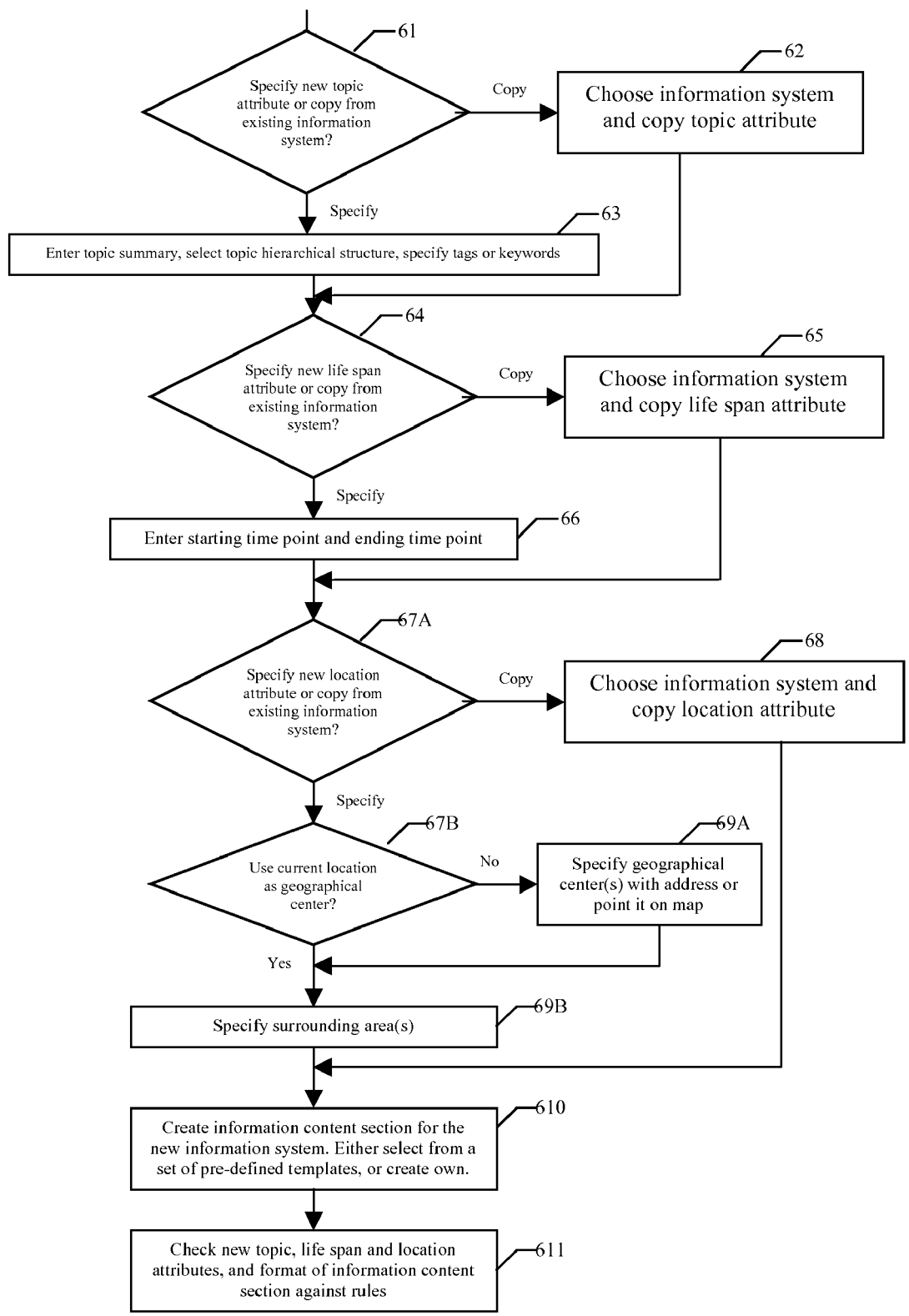
FIG. 6 is a flow diagram for generating a new information group, under an embodiment.

FIG. 6 is a flow diagram for generating a new information group, under an embodiment. Generating a new information group includes assigning attributes and generating or creating the information content section. Not only can users login and interact with existing information groups, they can also create new information groups. To create a new information group, a user assigns values to the three attributes topic, location and life span, and then creates the information content section. The assigning of a value to one particular attribute is independent from how value(s) is assigned to other attribute(s), and consequently the task of assigning values to topic, location and life span attributes is made up of three independent sub-tasks as assigning value to topic (61, 62 and 63), location (67A, 67B, 68, 69A and 69B), and life span (64, 65 and 66). Within each sub-task, a user can either explicitly specify the value 63, 66, 69A and 69B, or copy the value from an existing information group 62, 65 and 68. For example, a user could specify the topic attribute of a new forum G as "X goods exchange." Alternatively, if a user is inspired by the content of an information group A that he/she is currently logged into, he/she could ask information group F to copy the topic attribute of A, and then specify values for life span and location attributes and create a new information group.

The location attribute is slightly different from other attributes. When a user chooses to specify the geographical center for a location attribute 67A, he/she could either explicitly specify the address or point it on a map 69A, or use the current location of user or user device as the geographical center without typing the specific address or even knowing it 67B. To create the information content section for the new information group, he/she would either select a template from a pre-defined set of information content templates, or create new format for information content 610.

There can be global constraints on the value combination among the three attributes, and/or between attribute values and format of the information content section. The constrains of an embodiment are embedded as rules to which a newly-created information group conforms 611. A rule of an embodiment is that a new information group can share at most two attributes with existing information groups. Another rule is that for certain specific values on topic, location and/or life span attributes, the information content section can only have a pre-specified format. Of course, all the examples mentioned in this paragraph are merely exemplifications of the principal of creating attribute and information content section for new information group.

Figure 7:
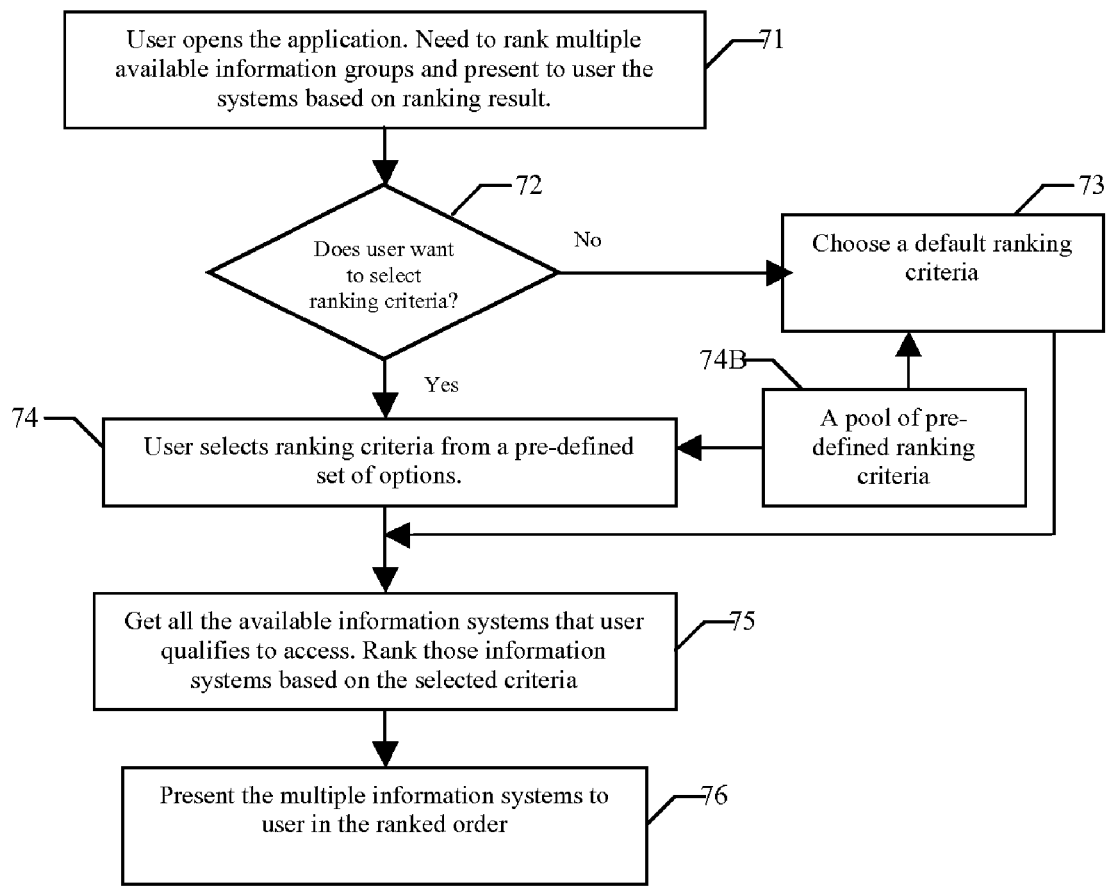
FIG. 7 is a flow diagram for ranking multiple information groups that overlap in time and location, under an embodiment.

FIG. 7 is a flow diagram for ranking multiple information groups that overlap in time and location, under an embodiment. A user can encounter multiple information groups at a particular time instance in one particular location such that both the life span and geographical areas specified by multiple information groups overlap with each other. The IGDP of an embodiment ranks multiple information groups that overlap in life span and location attributes. Those overlapped information groups are ranked so the most meaningful and significant information group concerning a specific location at a specific time is first presented to the user. The IGDP of an embodiment uses two methods of ranking multiple information groups.

A first method for ranking multiple information groups allows a user to select ranking criteria 74 from a pool of pre-defined ranking criteria 74B. A second method for ranking multiple information groups uses a default ranking criteria 73 from the pool of ranking criteria 74B. Regardless of ranking method in use, once the ranking criteria is selected, the information groups to which that user qualifies to login and access are ranked correspondingly 75, and the ranking results are presented to user 76.

The ranking criteria available for selection from the pool 74B includes, but is not limited to criteria that rank multiple information groups based on the distance variables, criteria that rank multiple information groups based on patterns or statistics concerning user activities inside or relates to corresponding information groups, and a combination of criteria that rank multiple information groups based on the distance variables and criteria that rank multiple information groups based on patterns or statistics concerning user activities inside or relates to corresponding information groups.

The distance-based ranking criteria is determined based on the output of a function F that takes at least one of the following inputs: distance(s) from the user to the geographical central point(s) of a particular information group; the distance(s) from the farthest point covered by the geographical region(s) of the corresponding information group to its central point(s).

The activities-based ranking criteria is determined based on the output of another function F' that takes at least one of the following inputs: number of unique users that have either logged in or interacted with the information group in a certain time period in the past; statistics concerning stay durations for those users who have previously logged in the information group; statistics concerning all other "user activities inside a particular information group", where "user activities inside a particular information group" is defined in the description of changing life span attribute of an information group. Some specific examples of "user activities inside a particular information group" include, but are not limit to, user leaving feedback to the information content section, inter-user communication activities, and statistics or patterns concerning "user activities applied to an information group". The "user activities applied to an information group" is defined in the description of changing life span attribute of an information group. Some specific examples of "user activities applied to an information group" include, but are not limit to, user using attribute value of an information group to create new information group, user searching a particular information group using specific tag, keyword or sub-topic hierarchical tree.

The ranking criteria for a combination of criteria (e.g., criteria that rank multiple information groups based on the distance variables and criteria that rank multiple information groups based on patterns or statistics concerning user activities inside or relates to corresponding information groups) provides the inputs of function F and F' to a third function F'', and uses the output of function F'' as the ranking of a particular information group among the available information groups to which a user qualifies to login and access.

Aspects of the IGDP described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IGDP include: microcontrollers with memory (such as electronically erasable programmable read only memory (EEPROM)), embedded microprocessors, firmware, software, etc. Furthermore, aspects of the IGDP may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the IGDP is not intended to be exhaustive or to limit the systems and methods to the precise forms disclosed. While specific embodiments of, and examples for, the IGDP are described herein for illustrative purposes, various equivalent modifications are possible within the scope of the systems and methods, as those skilled in the relevant art will recognize. The teachings of the IGDP provided herein can be applied to other systems and methods, not only for the systems and methods described above.

The elements and acts of the various embodiments described above can be combined to provide further embodiments. These and other changes can be made to the IGDP in light of the above detailed description.

What is claimed is:

1. A method of creating, or providing access to, or hosting at least one information group in the format of online user community, or forum, or trading platform, wherein the one information group is uniquely identified by topic, geographical location, and time span attributes;

wherein the geographical location attribute of an information group is defined as at least one particular geographical region that is defined as a geographical point and a surrounding area around that geographical point;

wherein the time span attributes of an information group are defined as the time between a starting point in time and an ending point in time, wherein the starting point has to be a specific time, defined in either local time or universal time, and the ending point can be either a specific time, defined in either local time or universal time, or an indefinite time instance;

wherein a user can login at least one information group if:
      the time instance of user login is inside the time span of the community, the time difference between the moment of user login and ending point in time is longer than a pre-defined time threshold, and
      the user can prove he/she is located at the same geographical location specified by that community at the time of login and during the time that he/she remains in the community;

wherein the information group has at least one content section, summarized by its topic attribute;

wherein a successfully logged-in user can retrieve, modify, delete, and create information stored inside information group content section;

wherein a successfully logged-in user can communicate with other users who are also in the same information group.;

and wherein the value of geographical location or time span attributes of an information group will dynamically change based on its users' activity.

2. The method of claim 1, wherein the topic attribute and content section of the information group relates to the geographical location attribute of the information group.

3. The method of claim 1, wherein the topic attribute and content section of an information group is about sharing transportation resource.

4. The method of claim 1, wherein the topic attribute and content section of an information group is about finding other users with certain types of needs or interests or who can provide certain types of services.

5. The method of claim 1, wherein the topic attribute and content section of an information group is about signing-on, or checking-in or adding users to a sign up sheet or waiting list, for services, or activities, or events, or conferences, or meetings.

6. The method of claim 1, wherein the topic attribute and content section of an information group is about promoting certain types of goods or services; or offering incentive, in the format of coupon, or credit, or rebate.

7. The method of claim 1, wherein an information group is created by specifying the value for its topic, geographical location, and time span attribute; or by copying attribute values from other existing information groups.

8. The method of claim 1, wherein the value of an information group's geographical location or time span attribute dynamically changes based on patterns or statistics regarding user login or user staying duration inside the information group.

9. The method of claim 1, wherein the value of an information group's geographical location or time span attribute dynamically changes based on patterns or statistics regarding users retrieving, or modifying, or deleting, or creating information stored in the content section of the information group.

10. The method of claim 1, wherein the value of an information group's geographical location or time span attribute dynamically changes based on patterns or statistics regarding users leaving feedback regarding a content section of the information group.

11. The method of claim 1, wherein the value of an information group's geographical location or time span attribute dynamically changes based on patterns or statistics regarding users communicating with other users through the information group.

12. The method of claim 1, wherein the value of an information group's geographical location or time span attribute dynamically changes based on patterns or statistics regarding using the value of geographical location or time span or topic attribute of the information group to create other information groups.

13. The method of claim 1, wherein the value of an information group's geographical location or time span attributes dynamically changes based on patterns or statistics regarding users searching for the information group based on its topic attribute value.

14. A method of ranking multiple information groups, wherein each information group is in the format of online user community, or forum, or trading platform, and is uniquely identified by topic, geographical location, and time span attributes;
    wherein the geographical location attribute of an information group is defined as at least one particular geographical region that is defined as a geographical point and a surrounding area around that geographical point;
    wherein the time span attributes of an information group are defined as the time between a starting point in time and an ending point in time, wherein the starting point has to be a specific time, defined in either local time or universal time, and the ending point can be either a specific time, defined in either local time or universal time, or an indefinite time instance;
    wherein a user can login at least one information group if:
        the time instance of user login is inside the time span of the community, the time difference between the moment of user login and ending point in time is longer than a pre-defined time threshold, and
        the user can prove he/she is located at the same geographical location specified by that community at the time of login and during the time that he/she remains in the community;
    wherein an information group has at least one content section, summarized by its topic attribute;
    wherein the successfully logged-in user can retrieve, modify, delete, and create information stored inside information group content section;
    wherein the successfully logged-in user can communicate with other users who are also in the same information group;
    and wherein the value of geographical location or time span attributes of an information group will dynamically change based on its users' activity.

15. The method of claim 14, wherein the criteria used for ranking multiple information groups is based on a function F that takes at least one input attribute, and where one of the input attributes is the distance(s) from the user to the geographical central point(s) of the information group.

16. The method of claim 14, wherein the criteria used for ranking multiple information groups is based on a function F that takes at least one input attribute, and where one of the input attributes is the distance(s) from the farthest point covered by the geographical region(s) attribute of the corresponding information group to its central point(s).

17. The method of claim 14, wherein the criteria used for ranking multiple information groups is based on a function F that takes at least one input attribute, and where one of the input attributes is the number of unique users that have either logged in or interacted with the information group in a certain time period in the past.

18. The method of claim 14, wherein the criteria used for ranking multiple information groups is based on a function F that takes at least one input attribute, and where one of the input attributes is the statistics concerning staying durations for those users who have previously logged in the information group.

19. The method of claim 14, wherein the criteria used for ranking multiple information groups is based on a function F that takes at least one input attribute, and where one of the input attributes is the statistics concerning users using the attribute value(s) of each information group to create other information groups.

20. The method of claim 14, wherein the criteria used for ranking multiple information groups is based on a function F that takes at least one input attribute, and where one of the input attributes is the statistics concerning users searching for an information group.

21. The method of claim 14, wherein the criteria used for ranking multiple information groups is based on a function F that takes at least one input attribute, and where one of the input attributes is the statistics concerning users retrieving, or modifying, or deleting, or creating information stored in the information group content section, or leaving feedback regarding the content section of the information group.

22. The method of claim 14, wherein the criteria used for ranking multiple information groups is based on a function F that takes at least one input attribute, and where one of the input attribute is the statistics concerning users communicating with other users through the information group.

23. A non-transitory computer readable storage medium comprising code segments for:
    creating, or providing access to, or hosting at least one information group in the format of online user community, or forum, or trading platform, wherein the one information group is uniquely identified by topic, geographical location, and time span attributes;
    wherein the geographical location attribute of an information group is defined as at least one particular geographical region that is defined as a geographical point and a surrounding area around that geographical point;
    wherein the time span attributes of an information group are defined as the time between a starting point in time and an ending point in time, wherein the starting point has to be a specific time, defined in either local time or universal time, and the ending point can be either a specific time, defined in either local time or universal time, or an indefinite time instance;
    wherein a user can login to at least one information group if:
        the time instance of user login is inside the time span of the community, the time difference between the moment of user login and ending point in time is longer than a pre-defined time threshold, and
        the user can prove he/she is located at the same geographical location specified by that community at the time of login and during the time that he/she remains in the community;
    wherein the information group has at least one content section, summarized by its topic attribute;

wherein a successfully logged-in user can retrieve, or modify, or delete, or create information stored inside information group content section;

wherein a successfully logged-in user can communicate with other users who are also in the same information group;

and wherein the value of geographical location or time span attributes of an information group will dynamically change based on its users' activity.

24. The computer readable storage medium of claim 23, wherein the topic attribute and content section of the information group relates to the geographical location attribute of the information group.

25. The computer readable storage medium of claim 23, wherein the topic attribute and content section of an information group is about a sharing transportation resource.

26. The computer readable storage medium of claim 23, wherein the topic attribute and content section of an information group is about finding other users with certain types of needs or interests or who can provide certain types of services.

27. The computer readable storage medium claim 23, wherein the topic attribute and content section of an information group is about signing-on, or checking-in or adding users to a sign up sheet or waiting list, for services, or activities, or events, or conferences, or meeting.

28. The computer readable storage medium of claim 23, wherein the topic attribute and content section of an information group is about promoting certain types of goods or services; or offering incentive, in the format of coupon, or credit, or rebate.

29. The computer readable storage medium claim 23, wherein an information group is created by specifying the value for its topic, geographical location, and time span attribute; or by copying attribute values from other existing information groups.

30. The computer readable storage medium of claim 23, wherein the value of geographical location or time span attributes of an information group dynamically changes based on patterns or statistics regarding user login or user staying duration inside the information group.

31. The computer readable storage medium of claim 23, wherein the value of geographical location or time span attributes of an information group dynamically changes based on patterns or statistics regarding users retrieving, or modifying, or deleting, or creating information stored in the content section of the information group.

32. The computer readable storage medium of claim 23, wherein the value of geographical location or time span attributes of an information group dynamically changes based on patterns or statistics regarding users leaving feedback regarding content section of the information group.

33. The computer readable storage medium of claim 23, wherein the value of geographical location or time span attributes of an information group dynamically changes based on patterns or statistics regarding users communicating with other users through the information group.

34. The computer readable storage medium of claim 23, wherein the value of geographical location or time span attributes of an information group dynamically changes based on patterns or statistics regarding users using the value of geographical location or time span or topic attribute of the information group to create other information group.

35. The computer readable storage medium of claim 23, wherein the value of geographical location or time span attributes of an information group dynamically changes based on patterns or statistics regarding users searching for the information group based on its topic attribute value.

36. A non-transitory computer readable storage medium comprising code segments for:

ranking multiple information groups, where each information group is in the format of online user community, or forum, or trading platform, and is uniquely identified by topic, geographical location, and time span attributes;

wherein the geographical location attribute of an information group is defined as at least one particular geographical region that is defined as a geographical point and a surrounding area around that geographical point;

wherein the time span attributes of an information group are defined as the time between a starting point in time and an ending point in time, wherein the starting point has to be a specific time, defined in either local time or universal time, and the ending point can be either a specific time, defined in either local time or universal time, or an indefinite time instance;

wherein a user can login to at least one information group if:
the time instance of user login is inside the time span of the community, the time difference between the moment of user login and ending point in time is longer than a pre-defined time threshold, and
the user can prove he/she is located at the same geographical location specified by that community at the time of login and during the time that he/she remains in the community;

wherein the information group has at least one content section, summarized by its topic attribute;

wherein a successfully logged in user can retrieve, or modify, or delete, or create information stored inside information group content section;

wherein a successfully logged in user can communicate with other users who are also in the same information group;

and wherein the value of geographical location or time span attributes of an information group will dynamically change based on its users' activity.

37. The computer readable storage medium claim 36, wherein the criteria used for ranking multiple information groups is based on a function F that takes at least one input attribute, and where one of the input attributes is the distance (s) from the user to the geographical central point(s) of the information group.

38. The computer readable storage medium of claim 36, wherein the criteria used for ranking multiple information groups is based on a function F that takes at least one input attribute, and where one of the input attributes is the distance (s) from the farthest point covered by the geographical region (s) attribute of the corresponding information group to its central point(s).

39. The computer readable storage medium of claim 36, wherein the criteria used for ranking multiple information groups is based on a function F that takes at least one input attribute, and where one of the input attributes is the number of unique users that have either logged in or interacted with the information group in a certain time period in the past.

40. The computer readable storage medium of claim 36, wherein the criteria used for ranking multiple information groups is based on a function F that takes at least one input attribute, and where one of the input attributes is the statistics concerning staying durations for those users who have previously logged in the information group.

41. The computer readable storage medium of claim 36, wherein the criteria used for ranking multiple information groups is based on a function F that takes at least one input attribute, and where one of the input attributes is the statistics concerning users using the attribute value(s) of each information group to create other information group.

42. The computer readable storage medium of claim 36, wherein the criteria used for ranking multiple information groups is based on a function F that takes at least one input attribute, and where one of the input attributes is the statistics concerning users searching for an information group.

43. The computer readable storage medium of claim 36, wherein the criteria used for ranking multiple information groups is based on a function F that takes at least one input attribute, and where one of the input attribute is the statistics concerning users retrieving, or modifying, or deleting, or creating information stored in the information group content section, or leaving feedback regarding the content section of the information group.

44. The computer readable storage medium of claim 36, wherein the criteria used for ranking multiple information groups is based on a function F that takes at least one input attribute, and where one of the input attribute is the statistics concerning user communicating with other users through the information group.

* * * * *